United States Patent Office 3,403,028
Patented Sept. 24, 1968

3,403,028
SOLUBLE SOLID PARTICULATE COMPOSITION FOR STABILIZED CHOCOLATE DRINK AND MAKING OF SAME
Dimitri J. Stancioff, Camden, and David L. Cassens, Rockland, Maine, assignors to Marine Colloids, Inc., Springfield, N.J., a corporation of Delaware
No Drawing. Filed Jan. 6, 1966, Ser. No. 518,992
7 Claims. (Cl. 99—26)

This invention relates to the preparation and composition of powdered and granulated chocolate flavoring products for making stabilized instant chocolate milk drinks.

Chocolate milk, prepared from cocoa, has been a popular household drink for many generations, but its preparation in the home is rather time-consuming because of the tendency of the cocoa to lump and stick when it is mixed with the milk. Generally preliminary dispersion of the cocoa with hot water is required before the milk is added and then, if a cold drink is desired, the mixture must be chilled before it is consumed.

Canned cocoa syrups have been used to overcome this and some of the other disadvantages of cocoa powder. However, they have disadvantages in use because they are messy to handle, difficult to measure, prone to harden in the can and spoil rather quickly once the can has been opened. Moreover, because of high density such syrups are difficult to mix with milk.

In order to avoid the disadvantages encountered with plain cocoa and cocoa syrups, a number of so-called instant cocoa products have been placed on the market. These products are primarily mixtures of cocoa and sugar processed in such a way as to render the cocoa more dispersible and more readily wetted by the milk. Instant cocoa mixes usually disperse in cold milk in less than 30 seconds with very little lumping.

A major disadvantage of homemade chocolate milk drinks, whether made with cocoa powder, syrup or instant mixes, is that the cocoa particles settle very rapidly, leaving the milk practically devoid of cocoa and forming a heavy sludge in the bottom of the container or glass. A generally accepted way of preventing cocoa from settling in commercial chocolate milks is the use of stabilizers, such as carrageenan, which form thixotropic systems in the milk. Properly formed, such a system keeps the cocoa in suspension indefinitely. Carrageenan is the extract of certain red seaweeds such as *Chondrus crispus, Gigartina pistillata, Gigartina acicularis, Iridaea laminaroides* and other species of the order Gigartinales.

While carrageenan extract powders are used extensively by dairies for making stabilized chocolate milk drinks, they, as presently manufactured, are unsuited for use in the preparation of homemade chocolate drinks. They do not dissolve rapidly enough to exert their full stabilizing power unless equipment for proper heating, stirring, and cooling is available.

When a blend of carrrageenan, sugar and cocoa which has been produced by simple blending is dispersed in milk at ordinary room temperature, the carrageenan swells but does not dissolve for several hours. In the meantime the cocoa settles. Moreover, the swollen carrageenan gel particles assume an unattractive appearance usually referred to in the trade as "fish eyes." When attempt is made to obtain more rapid stabilization of the cocoa by the employment of a larger quantity of carrageenan, the gradual dissolution of the excess carrageenan results in continued thickening until the beverage may assume an undesirable pudding-like consistency. Ultra-fine grinding of the carrageenan hastens the solubility somewhat, but not sufficiently to provide the desire degree of stabilization in the time required.

Attempts to incorporate the carrageenan powder into the flavoring product by the various granulating processes used for making the cocoa instantly dispersible have also been unsuccessful because the carrageenan in each single granule coalesces, as the sugar and cocoa dissolve and disperse, leaving the usual fish eye of undissolved stabilizer.

One of the principal objects of this invention is, therefore, to provide a chocolate flavoring product which contains a stabilizer, quickly and completely soluble, that will effectively prevent the cocoa from settling in the chocolate milk drink prepared therefrom.

It is a further object of this invention to make a chocolate flavoring product that is instantly dispersible in cold milk with minimal lumping.

Yet another object is that the stabilizer be dissolved rapidly so that it may exert its full stabilizing potential almost immediately without the presence of fish eyes and without causing excessive thickening on standing.

It is a feature of this invention that molecularly dispersed carrageenan is provided in particulate form comprised in a solid sugar syrup, namely, in a sugar solution that is in solid particulate form. The solid particles are referred to as being particles of solid syrup in the sense that the sugar remains as a solid aqueous solution in which the carrageenan is dissolved in essentially a molecularly dispersed state. The solid syrup is made by first dissolving the carrageenan and a small amount of sugar in just enough water to make a very thick paste which is fluid in the sense that it can be caused to flow. More sugar is then added until the solution is saturated with sugar. The remainder of the sugar and the cocoa are finally added and kneaded into the carrageenan sugar mixture until the whole mass takes on the appearance of a crumbly, friable, slightly moist solid. The exact order of addition of the ingredients is not critical so long as the carrageenan is properly dissolved and enough sugar is dissolved in the preliminary solution to ensure that the carrageenan be well distributed throughout the mixture. The lower limit for the amount of sugar that should be in solution before any cocoa is added is about four times the weight of the carrageenan, and the upper limit is set by the total amount of sugar desired in the finished product. Generally it is preferable to dry blend part of the sugar with the cocoa because it helps make a more homogeneous mixture.

In order to dissolve the carrageenan it is necessary to heat the water containing the carrageenan substantially to boiling and the quantity of sugar which provides the initially produced heavy syrup is present during this step. When adding the balance of the solid ingredients so as to convert the heavy syrup to a friable solid, the syrup preferably is maintained at elevated temperature since later added materials, and more particularly the later added cocoa and sugar, become more readily and effectively worked into the syrup and a somewhat more readily dispersible product is obtainable. However, after the initial solution of the carrageenan is formed at elevated temperature, the balance of the dry materials may be worked into the syrup after it has cooled.

It is important that the cocoa be added after the initial formation of the sugar syrup containing dissolved carrageenan with the weight ratio of sugar to carrageenan at least 4:1, for otherwise the cocoa tends to take up at least some of the carrageenan and retain it in such condition that when the finished product is added to milk objectionable formation of fish eyes occurs. When the carrageenan is initially dissolved in the concentrated sugar solution in the presence of at least the mentioned amount of sugar, the carrageenan is believed to be held in molecularly dispersed condition and is maintained in this condition due to the presence of the water in which it is dissolved and due to the presence of the sugar during conversion of the fluid syrup to the solid friable consistency including the incorporation of the cocoa therewith.

The basic ingredients required for the proper preparation of the chocolate flavoring mix are carrageenan, sugar, cocoa and water. The carrageenan may be derived from any of a number of seaweeds of the order Gigartinales. Different carrageenans exhibit somewhat different characteristics, depending on their source, as regards their capacity to form aqueous gels and to suspend cocoa particles in milk; and it is preferable to employ a carrageenan which possesses weakly gelling properties in water while being readily soluble in milk. Examples of such carrageenans are extracts from the species *Chondrus crispus, Gigartina pistillata, Gigartina acicularis* and *Iridaea laminaroides*. Carrageenan is known to contain two fractions, namely, the lambda fraction and the kappa fraction (U.S. patent No. 3,176,003). It is the lambda fraction which possesses little or no water gelling characteristics and which is primarily responsible for stabilizing a cocoa suspension in milk. Accordingly, the carrageenan that is used preferably is one that naturally is high in lambda carrageenan or is in the form of lambda carrageenan from which carrageenan has been separated.

The preferred sugars are sucrose or dextrose but these may be partly or fully replaced by dextrin, lactose, corn syrup solids, invert sugars, liquid sugar or corn syrup. For best results the sugar should be granulated or ground to pass a sieve of 20 mesh or finer.

The cocoa may be of any type suitable for flavoring milk. The fat content of cocoa varies according to manufacturing practices and may vary between 5% and 30%. Dutch process (alkali treated) cocoa and American process cocoa are equally suitable.

Besides carrageenan, sugar and cocoa, other ingredients, although not essential, may be included in the flavoring mix if so desired. For example, salt, vanilla, caramel, cinnamon, and artificial flavors may be included to enhance the flavor. Dispersing or emulsifying agents may be used in order to facilitate dispersion of the cocoa throughout the mix. Starch and inorganic anti-caking materials may be used to aid in mixing or to prevent caking during prolonged storage under adverse conditions. If a more viscous milk drink is desired, other vegetable gums compatible with carrageenan may be used. Such gums include gum arabic, galactomannans, starch and dextrin.

The amount of carrageenan that is incorporated in the chocolate drink mix depends on the type of carrageenan and on the amount of finished composition that will be used to flavor the milk. Carrangeenan generally stabilizes milk over a relatively narrow range of concentrations. Below a certain minimum concentration the cocoa settles. Above a certain maximum concentration the milk takes on a gelled, pudding-like appearance which is unsightly and therefore less palatable. It is best to use the carrageenan stabilizer at a level which is intermediate between these two extremes. This optimum level normally ranges from about 0.02% to 0.2% of the weight of the milk, depending on the type and quality of the carrageenan used.

The amount of cocoa and sugar used in the chocolate flavored mix depends on the amount of flavoring desired. Generally a mix is formulated so that, when it is used at the recommended level, the milk will contain from 0.75% to 3% cocoa and from 3% to 12% sugar, based on the weight of the milk. Accordingly, a mix for flavoring 100 parts of milk normally is prepared with 0.75 to 3 parts of cocoa, 3 to 12 parts of sugar and 0.02 to 0.2 parts of carrageenan.

The amount of water needed for preparation of the mix will vary with the amount of other ingredients in the formula. It should be sufficient to dissolve all the carrageenan and sugar in the preliminary solution, but the amount should not be so large as to make the mix sticky and difficult to handle. In order to get a good product, the amount of water should vary from 4% to 15% of the total weight of other ingredients and preferably does not exceed 10%.

It is apparent that the amount of water required to get the carrageenan into solution with dissolved sugar has been found to be quite small and it should be held down to a small amount. The quantity of water normally does not exceed twenty times the weight of the carrageenan and preferably is substantially less. It may be as littles as seven times the weight of the carrageenan, as illustrated by Example 7 hereof. However, the minimum amount of water depends on the solubility of the carrageenan that is used and is governed by the requirement for the dissolution of the carrageenan in the concentrated sugar solution.

By the foregoing procedure a friable composition is provided which exhibits the characteristics of a solid in that when in particulate form the particles may be separated as by means of screens into different particle sizes for the recovery of particles which are of the size range desired for the finished product. For convenience in handling as well as ready dispersibility and solubility in milk, it is desirable that the bulk of the particles shall pass a standard 20-mesh screen while being retained on a standard 120-mesh screen.

After the product has initially been produced in friable particulate form, the particles may be dried in order to reduce the water content to about 0.1% to 3%, although this is not necessary in the practice of this invention.

It is much preferable to work the cocoa into the sugar syrup while it still contains water to the extent of at least about 5% of the total weight of the other ingredients so that the cocoa particles may be worked into the particles of solid syrup and become an integral part thereof. When thus made integral with the solid syrup particles the cocoa becomes dispersed very readily in the milk with which the particulate composition is mixed. While the advantage of immediate dispersibility of the carrageenan with development of little or no gelation of carrageenan resulting in fish eyes can be obtained if the cocoa particles are merely dry-mixed with the solid syrup particles, nevertheless it is much better in the practice of this invention to make the cocoa particles integral with the solid syrup particles for otherwise the cocoa particles have a tendency to lump when the composition is added to cold milk. Moreover, when the cocoa is integral with the solid syrup particles the particulate product can be classified through screens to much greater advantage. Moreover, drying with a minimum of heat is facilitated.

The resulting chocolate flavoring mix is effective in stabilizing drinks made with various forms of fluid milk. Thus the milk may be fresh milk or it may be pasteurized, homogenized, partly skimmed, skimmed, reconstituted powdered whole milk, or reconstituted powdered skim milk. If desired, powdered milk may be comprised in the solid particulate composition whereby a stabilized chocolate milk drink may be had upon adding the composition to water.

Example 1

A blend of 2.15 grams carrageenan and 7.5 grams of sugar was dispersed in 37.5 grams of water until a thick paste was formed. The paste was brought to boiling in a steam-heated stainless steel pot and 150 grams of granulated sugar were gradually added with constant vigorous stirring. A dry blend of 44 grams of cocoa and 120 grams of sugar was added next; it was mixed in thoroughly with a spatula until the product was uniformly brown in color. At this point heating was discontinued and the semi-solid mass was cooled until it began to crumble into small, somewhat moist, granules. The granules were screened and dried in an oven at 60° C. for 1.5 hours. The dried product was sifted through standard screens in order to remove particles coarser than 35-mesh and finer than 50-mesh. A chocolate drink was prepared by stirring 10 grams of the final product into 100 grams of reconstituted skim milk, namely, a solution of 9 grams non-fat milk solids in 91 grams water. The granules dispersed rapidly and dissolved completely in 60 seconds. The drink had an attractive appearance with no fish eyes. There was no settling of cocoa even after standing at room temperature for 2 hours, nor was there any excessive thickening on holding the drink in the refrigerator overnight.

Example 2

A blend of 2.69 grams of carrageenan and 10 grams of sugar was dispersed in 37.5 grams of water and 2.0 grams of hydroxylated lecithin were mixed into the paste which was then brought to a boil. 200 grams of superfine granulated sugar were poured into the boiling mixture and blended in thoroughly. A dry blend of 55 grams of cocoa and 170 grams superfine sugar was added next. The mixture was stirred until it appeared homogeneous. It was then cooled and broken up into granules small enough to pass through a 35-mesh sieve. The granules were then classified further into three portions:

(a) Particles passing 35-mesh but coarser than 50-mesh;
(b) Particles finer than 50-mesh but coarser than 80-mesh;
(c) Particles finer than 80-mesh.

All three portions were dried for 1½ hours at 60° C. and tested in milk in the same fashion as in Example 1. The coarsest material dispersed perfectly and dissolved in about 1 minute. The granules of intermediate size dispersed well and dissolved in about 40 seconds, with the exception of a few small lumps which stuck to the bottom of the glass.

The finest material had a tendency to form lumps which took 2 to 3 minutes to dissolve.

Stabilization was perfect in all cases; there were no fish eyes nor was there any settling or thickening on standing.

Example 3

A blend of 2.69 grams of carrageenan and 10 grams of sugar was dispersed in 37.5 grams of water and the resulting paste brought to a boil. 200 grams of superfine granulated sugar was poured into the boiling mixture and blended in thoroughly. A dry blend of 55 grams cocoa and 170 grams of superfine sugar was added next. The mixture was stirred until it appeared homogeneous. It was then cooled and broken into granules small enough to pass a 40-mesh sieve. The product was dried for 1½ hours at 60° C. The dry product was then blended with 1% by weight of hydroxylated lecithin and dried again. When tested in milk by the procedures described in Example 1, the mixture dispersed instantly and dissolved in 40 seconds. No fish eyes were visible in the milk and stabilization was perfect.

Example 4

A blend of 2.69 grams of carrageenan and 10 grams of sugar was dispersed in 37.5 grams of water and the resulting paste brought to a boil. 200 grams of superfine granulated sugar was poured into the boiling mixture and blended in thoroughly. A dry blend of 55 grams cocoa and 170 grams of superfine sugar was added next. The mixture was stirred until it was homogeneous. Heating was discontinued and 10 grams of cornstarch were blended into the mix while it was being cooled. The mix was broken into granules small enough to pass through a 40-mesh screen. The product was dried for 1½ hours at 60° C. When tested in milk by the procedure described in Example 1, the mixture dispersed instantly and dissolved in 40 seconds. No fish eyes were present and stabilization was perfect.

Example 5

A blend of 2.69 grams of carrageenan and 40 grams of sugar was dispersed in 37.5 grams of water, brought to a boil and then cooled to 25° C. A dry blend of 55 grams of cocoa and 100 grams of superfine sugar was added next and kneaded into the mix with 1.0 gram of vanillin. After sifting through a 30-mesh screen, drying at 60° C. for 1½ hours, 15 grams of the product were added to 150 grams of fresh, pasteurized, homogenized whole milk. Dispersion was very good and the particles dissolved in less than 1 minute. There were no fish eyes and stabilization was perfect.

Example 6

Carrageenan, 1.6 grams, was mixed, respectively, with the amounts of sugar and water shown in the following table; the whole was brought to a boil and then cooled. This mixture was added to a dry blend of 250 grams of superfine sugar and 50 grams of Dutch process cocoa and thoroughly kneaded. It was then passed through progressively finer screens until it all passed through 40-mesh and 90% of it passed through 50-mesh. The product was dried at 60° C. for 1½ hours and tested in homogenized whole milk. The results are shown in the table below.

| Mix No. | Composition of preliminary solution | | Performance in milk |
|---|---|---|---|
| | Water, gms. | Sugar, gms. | |
| 1 | 20 | 15 | Fair dispersion and solubility. A few inconspicuous fish eyes. |
| 2 | 25 | 15 | Same as No. 1. |
| 3 | 20 | 20 | Good dispersion and solubility. A few inconspicuous fish eyes. |
| 4 | 25 | 25 | Excellent dispersion and solubility. A few inconspicuous fish eyes. |
| 5 | 25 | 50 | Good dispersion. Excellent solubility. No fish eyes. |
| 6 | 30 | 75 | Excellent dispersion. Fair solubility. No fish eyes. |
| 7 | 25 | 60 | Excellent dispersion and solubility. Very few inconspicuous fish eyes. |

In all the above series, stabilization against cocoa settling was very good.

A dry blend of all ingredients, except the water, used in mix No. 6 of this series was also tested in milk. The mixture lumped so badly that it would not disperse even after 5 minutes of stirring. Numerous large fish eyes floated near the top of the glass and the cocoa started to settle to the bottom of the glass as soon as stirring was discontinued.

In this example a rating of fair solubility and dispersibility means that it took about 1 minute to get a drink which was homogeneous and free of lumps or undissolved granules. A rating of excellent means that it took less than 30 seconds to achieve this result.

When the amount of water contained in mix No. 1 was reduced to 15 grams there was adequate water to dissolve the carrageenan and maintain it in molecularly dispersed condition so as to be highly effective against cocoa settling. However, under the conditions of cold mixing following the initial formation of the concentrated solution the finished dry composition was substantially less readily dispersed as compared with mix No. 1. However, the dispersibility was far better than that of the aforesaid mixture, which had been merely dry blended without formation of a concentrated syrup solution.

Example 7

A mix was prepared by the same method as mix No. 4 in Example 6 except that the American process cocoa was used instead of the Dutch type. The mix dispersed and dissolved well and only a few inconspicuous fish eyes were visible.

Example 8

A blend of 3.6 grams of carrageenan and 25 grams of sugar was dispersed in 25 grams of water and the resulting paste brought to a boil and then cooled. A dry blend of 175 grams of superfine sugar and 50 grams of cocoa was added next. The mixture was kneaded until homogeneous and broken into granules small enough to pass a 50-mesh screen but coarser than 80-mesh. The product was dried for 1½ hours at 60° C. 11.5 grams of the product were stirred into 150 grams of whole milk. It dissolved in less than 30 seconds and stabilized exceptionally well. No fish eyes were visible and there was no excessive thickening overnight.

Example 9

A mix was made as in Example 8 except that 300 grams of dextrose were used in place of the 175 grams of granulated sugar. The mix performed about the same as the mix described in Example 8.

Example 10

A mix was made exactly as in Example 8 except that the cocoa contained only 12% to 14% fat instead of 22% fat as in the other examples. The mix performed about the same as the one described in Example 8.

Example 11

A mix was made as in Example 8 except that the blend of sugar and cocoa was mixed with 1 gram of a surfactant sold under the trade designation Tween 80 before being kneaded with the preliminary solution of carrageenan and water. The surfactant made the cocoa-sugar blend much more uniform and facilitated mixing. In milk the mix performed about the same as the one described in Example 8, except that it wet out a little faster. The rate of solubility was not altered. A similar mix made with low fat (12–14%) cocoa gave the same results.

Example 12

11.5 grams of the mix described in Example 8 were blended with 13.5 grams of spray-dried skim milk solids. This blend was poured into 150 grams of water and stirred for 20 seconds. The resulting beverage was uniform in appearance, had no undissolved particles, no fish eyes and did not become thick overnight. No cocoa settling was observed.

We claim:
1. A method of making a solid particulate composition that is readily dispersible in an aqueous liquid to provide a chocolate-flavored beverage, which method comprises providing a concentrated fluid sugar syrup contained dissolved carrageenan dispersed therein, and working into said syrup additional material which includes additional sugar and which is sufficient in quantity to convert said fluid syrup into a friable particulate solid containing said carrageenan in the dissolved state, and adding cocoa so as to be commingled with said friable particulate solid, said carrageenan being dissolved in said syrup in the presence of at least about four times its weight of dissolved sugar prior to the addition of said cocoa.

2. A method according to claim 1 wherein the cocoa is worked into said friable syrup during its conversion to said friable solid state so as to become an integral part thereof.

3. A method according to claim 1 wherein the water content of said syrup does not exceed about twenty times the weight of said carrageenan.

4. A method of making a particulate composition that is readily dispersible in an aqueous liquid and that comprises by weight about 3 to about 12 parts of sugar, about 0.02 to about 0.2 part of carrageenan and about 0.75 to about 3 parts of cocoa, said method comprising dissolving said carrageenan and a portion of said sugar in water to form a concentrated sugar solution containing the dissolved carrageenan wherein the amount by weight of the sugar is at least about four times that of said carrageenan, working the balance of the sugar and the cocoa into said concentrated solution and thereby converting the concentrated solution into a friable solid wherein the water content is about 4% to about 15% by weight of the other ingrediens of said friable solid.

5. A method according to claim 4 wherein said friable solid is produced in particulate form and thereafter dried to reduce the water content thereof.

6. A solid particulate composition readily soluble in an aqueous liquid to provide a chocolate-flavored beverage, said composition comprising solid particles of sugar syrup containing carrageenan dissolved therein and wherein the ratio of sugar to carrageenan is at least 4:1 and said composition comprising cocoa, the particles of which are integral with said solid particles of sugar syrup and said composition being made by the method of claim 1.

7. A solid particulate composition according to claim 6 which contains by weight about 3 to about 12 parts of sugar, about 0.02 to 0.2 part of carrageenan and about 0.75 to 3 parts of cocoa.

References Cited

UNITED STATES PATENTS

| 2,462,398 | 2/1949 | Hess et al. | 99—25 X |
| 2,830,903 | 4/1958 | Berndt et al. | 99—25 |
| 2,834,679 | 5/1958 | Stoloff | 99—25 X |
| 3,248,226 | 4/1966 | Stewart | 99—26 |

FOREIGN PATENTS

| 501,065 | 2/1939 | Great Britain. |
| 627,212 | 8/1949 | Great Britain. |

LIONEL M. SHAPIRO, *Primary Examiner.*

D. M. NAFF, *Assistant Examiner.*